United States Patent
Messner et al.

(10) Patent No.: US 6,471,295 B1
(45) Date of Patent: Oct. 29, 2002

(54) HEADREST ARRANGEMENT FOR A VEHICLE SEAT

(75) Inventors: Manfred Messner, Munich; Roland Kluehspies, Ochsenfurt; Wolfgang Popp, Bad Windsheim; Friedrich Scheller, Iphofen; Thomas Leneis, Reithofen; Franz Tobisch, Munich, all of (DE)

(73) Assignees: F.S. Fehrer GmbH & Co. KG (DE); Bayerische Motoren Werke Aktiengesellshaft (DE)

(*) Notice: Subject to any disclaimer, the term of this patent is extended or adjusted under 35 U.S.C. 154(b) by 0 days.

(21) Appl. No.: 09/695,439

(22) Filed: Oct. 25, 2000

(30) Foreign Application Priority Data

Oct. 25, 1999 (DE) ...................... 299 18 761 U

(51) Int. Cl.[7] .................................. A47C 7/36
(52) U.S. Cl. .................. 297/410; 297/404; 297/216.12
(58) Field of Search ................ 297/391, 396, 297/404, 406, 407, 408, 409, 216.12, 216.13

(56) References Cited

U.S. PATENT DOCUMENTS

| | | | | |
|---|---|---|---|---|
| 2,102,351 A | * | 12/1937 | Beck et al. ................. | 297/396 |
| 3,328,083 A | * | 6/1967 | Bourne ....................... | 297/404 |
| 3,802,737 A | | 4/1974 | Mertens | |
| 5,823,619 A | * | 10/1998 | Helig et al. ............ | 297/216.12 |
| 5,829,838 A | | 11/1998 | Offenbacher | |
| 5,927,804 A | * | 7/1999 | Cuevas ................... | 297/408 X |
| 6,022,074 A | * | 2/2000 | Swedenklef ....... | 297/216.13 X |
| 6,199,947 B1 | * | 3/2001 | Wiklund ................ | 297/216.12 |
| 6,213,549 B1 | * | 4/2001 | Wieclawski ........ | 297/216.12 X |

FOREIGN PATENT DOCUMENTS

| | | |
|---|---|---|
| DE | 296 03 991 | 8/1996 |
| DE | 296 09 786 U1 | 8/1996 |
| DE | 197 43 339 A1 | 4/1998 |
| DE | 197 04 974 A1 | 7/1998 |
| DE | 298 08 831 | 10/1998 |
| DE | 197 46 463 C1 | 1/1999 |
| DE | 199 00 368 A1 | 9/1999 |
| EP | 0 888 926 | 1/1999 |
| GB | 2 316 863 | 3/1998 |

* cited by examiner

*Primary Examiner*—Laurie K. Cranmer
(74) *Attorney, Agent, or Firm*—McGlew and Tuttle, P.C.

(57) ABSTRACT

A headrest arrangement (22) for a vehicle seat is provided with at least one backrest (10) and a headrest device (14). A mechanical transmission device is included for transformation of a deformation of the backrest (10) into a movement of the headrest device (14).

20 Claims, 3 Drawing Sheets

HEADREST ARRANGEMENT FOR A VEHICLE SEAT

FIELD OF THE INVENTION

The present invention relates to a headrest arrangement for a vehicle seat comprising at least one backrest and a headrest device.

BACKGROUND OF THE INVENTION

Vehicle seats often comprise headrests which are fastened to the upper end of a backrest. In this context, different fastening possibilities can be considered. For example, the headrest can be connected fixedly to the backrest but can also be height-adjustable and pivotable in order to be adapted to the anatomy of different vehicle passengers.

Conventional vehicle seats have the problem that the spacing between the back of the head of a vehicle passenger and the headrest can possibly be very large depending on the seating position of the vehicle passenger. This problem occurs especially, but not exclusively, in regard to vehicle seats where the incline of the backrest can be selected differently.

A large spacing between the back of the head and the headrest, however, is very dangerous for the vehicle passengers in the case of an accident, especially in the case of a rear impact. In the case of an impact, a very great relative acceleration between the headrest and the head of the vehicle passenger occurs which results in a very hard impact of the back of the head on the headrest. Severe head injuries can be the result.

A solution for preventing such a great spacing between the back of the head and the headrest is proposed in DE 298 08 831 U1. The vehicle seat described therein comprises a two-part backrest. An upper part of the backrest on which the headrest is fastened is rotatably embodied relative to the lower part of the backrest. In this connection, the upper part is forced by a spring into a forward rest position and is pivotable toward the back when the vehicle passenger rests against it. A disadvantage of this system is the high manufacturing expenditure. In order to be able to ensure a protection as effective as possible in the situation of accidents, not only the installation of a spring means but also of a shock absorber is required. Moreover, the construction described here is only suitable to a limited extent for the vehicle backseats. Finally, the movable construction of the backrest can be perceived as uncomfortable by some vehicle passengers.

SUMMARY AND OBJECTS OF THE INVENTION

It is therefore an object of the present invention to provide a headrest arrangement for a vehicle which reduces the injury risk for the neck area and back area of the neck of the vehicle passenger in an accident and is furthermore characterized by a simple configuration.

According to the invention, a headrest arrangement is provided for a vehicle seat comprising at least one backrest and a headrest device. A mechanical transmission device is provided for the transformation of a deformation of the backrest into a movement of the headrest device.

The invention resides substantially in that a mechanical transmission device transforms a deformation of the backrest into an oppositely oriented movement of the headrest device so that the headrest device is moved toward the back of the head of the vehicle passenger. The deformation of the backrest is effected by the inertia forces which the vehicle passenger exerts onto the backrest, for example, in the situation of a rear impact. Accordingly, this is a purely passive system which requires no active components. The advantage of a minimal service expenditure can therefore be realized together with a very high reliability of the system. Moreover, also with regard to manufacturing technological considerations, the seat and headrest arrangement according to the invention can be relatively easily manufactured because it requires only a few component groups.

An especially preferred configuration of the headrest arrangement can be realized when for forming the transmission device the backrest comprises a deformable support structure which is supported on a contact device in a bending-resistant transition area between the backrest and the headrest device. The support structure forms the mechanically stable part of the backrest and can be upholstered for improving the comfort of the seat. The support structure deforms when an accident occurs and, by means of the mechanical transmission device, the headrest device is moved. The support structure can be formed in any suitable way, for example, as a surface member or as a grate member and can be subsequently embedded in foam in a known manner with an upholstery material. A surface member configuration of the support structure can also be provided with holes so that embedding in foam can be realized more easily and more permanently.

It has been proven to be especially advantageous to form the support structure as a shell-like support shell. This makes it possible in an especially easy way to adapt the backrest to the shape of the anatomy of the back and to thus realize an especially comfortable vehicle seat. It is especially advantageous that with such a backrest the upholstery portions can be provided over the entire surface area of the backrest with substantially the same thickness which is very advantageous with respect to manufacturing technological aspects.

The headrest device can be connected by fastening means with the support structure so that known headrest devices can be employed for realizing the headrest arrangement.

An especially simple configuration results when at least one part of the headrest device is formed by a correspondingly shaped part of the support structure. Such a one-part, integral configuration allows an especially inexpensive production. A possibly required stiffening in the transition area between the support structure and the headrest device can be realized, for example, in that the material in the area of the headrest device has a greater cross-section or that in the transition area recesses are provided in which additional reinforcement elements can be inserted.

It is especially advantageous to provide a stop device which limits the deformability of the backrest. With such a stop device, the movement of the backrest can be limited to such an extent that, when an accident occurs, the upper body remains in a substantially vertical position in which the accelerations occurring during an impact present the most minimal injury risk for the vehicle passengers. At the same time such a stop device can also represent the contact device of the mechanical transmission device, which in cooperation with the support structure of the backrest, transforms the deformation of the backrest into a movement of the headrest device. For example, in the simplest case, the stop device can be comprised of a profile which is connected to the car body and on which, in the case of the headrest device being connected directly to the backrest, the transition area between the headrest and the backrest is supported. For example, a rearwardly oriented deformation of the backrest is then transformed in the simplest manner into a forward movement of the headrest device. However, other embodiment variants of the stop device are possible, for example, the use of a rotary joint.

In order to avoid an excessive deformation of the backrest with respect to the anatomy of the back, which could result in itself in injuries in the back area of the vehicle passenger, an especially preferred embodiment of the stop device is characterized in that it is of a cavity shape. Accordingly, the backrest, in its maximally deformed position, is also cavity-shaped so that the risk of injury is reduced. Such a cavity-shaped stop device can especially be substantially sheet-like. Since, generally, in any type of vehicle seat a structure is to be provided that is as stable and as sheet-like as possible and provides protection against loose parts which could fly forward during an accident, such a cavity-shaped stop device can be realized without great additional expenditure.

It is a further advantage when for the headrest arrangement the configuration of the support structure of the backrest, respectively, the materials for the backrest as well as for the support structure are selected such that the backrest acts as an energy-dissipating means. Accordingly, already during the deformation of the backrest when an accident occurs, a deceleration of the vehicle passengers can be achieved so that the maximum acceleration forces acting on the vehicle passenger are reduced. The vehicle seat acts thus as an additional crumple zone and is thus especially safe.

When the headrest arrangement is provided on a backseat, the backrest can be used at the same time for forming a divider between the passenger compartment and the trunk space.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
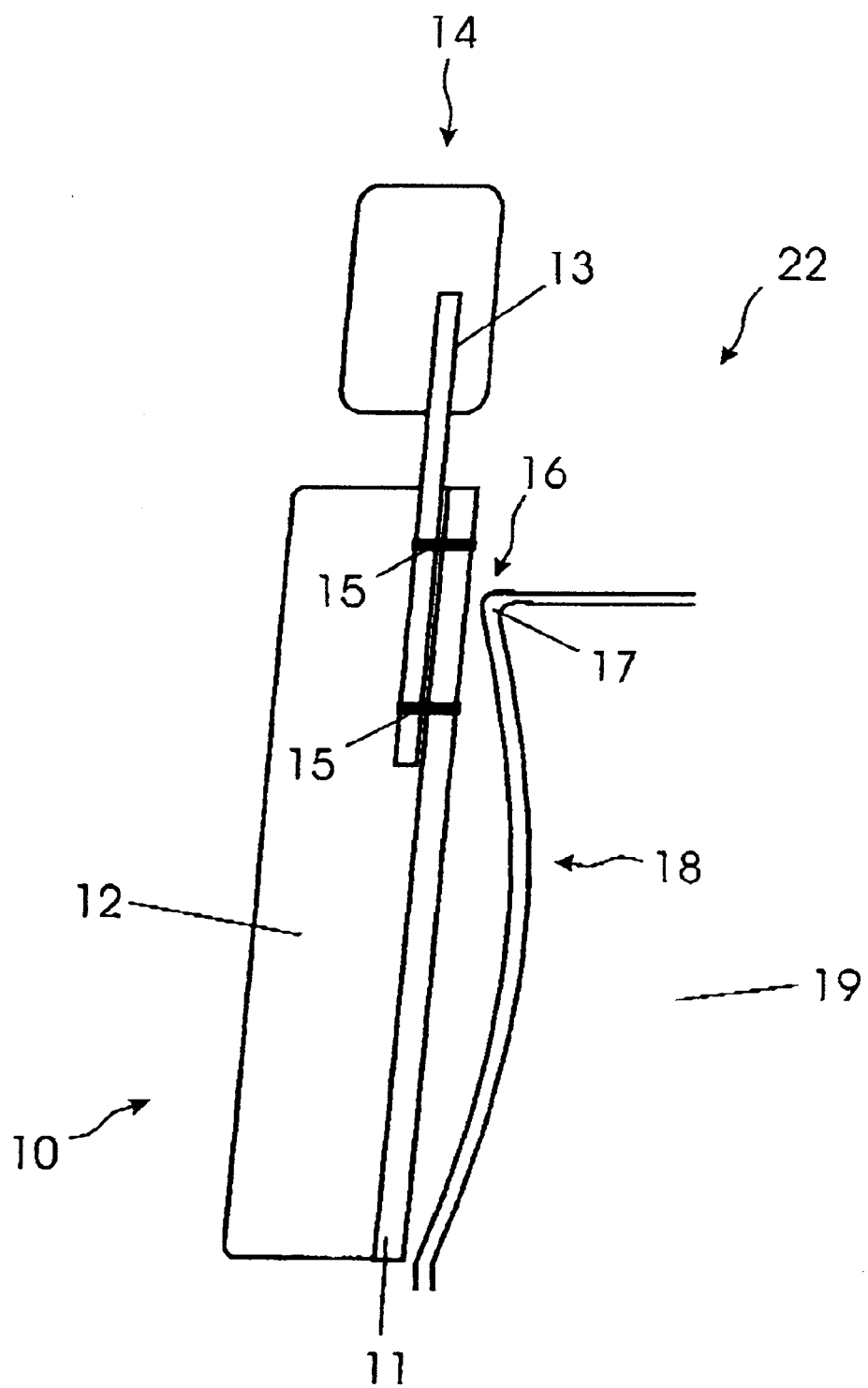
FIG. 1 is a cross-sectional side view of a first embodiment of a headrest arrangement in the undeformed state.

Referring to the drawings in particular, FIG. 1 shows in a greatly simplified form the essential components of a headrest arrangement 22 which is arranged on a vehicle seat in the back of a vehicle. The headrest arrangement 22 comprises a backrest 10 with a support structure embodied as a support shell 11 on which upholstery 12 is fastened. The attachment of the upholstery 12 can be realized in a known manner, for example, by embedding the support shell 11 in foam. At the upper end of the backrest 10, a headrest 14 provided as a separate component is located which is fastened by means of fastening rods 13 on the support shell 11. The attachment of the fastening rods 13 on the support shell 11 is realized in the illustrated embodiment by a screw or clamping connection 15. The headrest 14 can be connected so as to be movable relative to the support shell 11 or can be rigidly connected to the support shell 11.

The backrest 10 has positioned opposite thereto a stop device 18 with defined stiffness or flexibility. It can be comprised, for example, of profiled sheet metal. In the illustrated embodiment, the stop device 18 is of a shell-like shape. The stop device 18 represents, at the same time, the partition between the trunk space 19 and the passenger compartment. The illustrated stop device 18 has a contact stay 17 on which a transition area 16 of the backrest 10 is supported. This transition area 16 represents the upper part of the backrest 10 in which the backrest 10 has a transition into the securing device of the headrest 14.

In the illustrated embodiment the support shell 11 is planar while the stop device 18, on the other hand, is shell-shaped. It is also possible to form the support shell 11 as a shell shape and the stop device 18 as a planar member. Also, it is possible to embody the support shell 11 as well as the stop device 18 in a shell shape.

Figure 2:
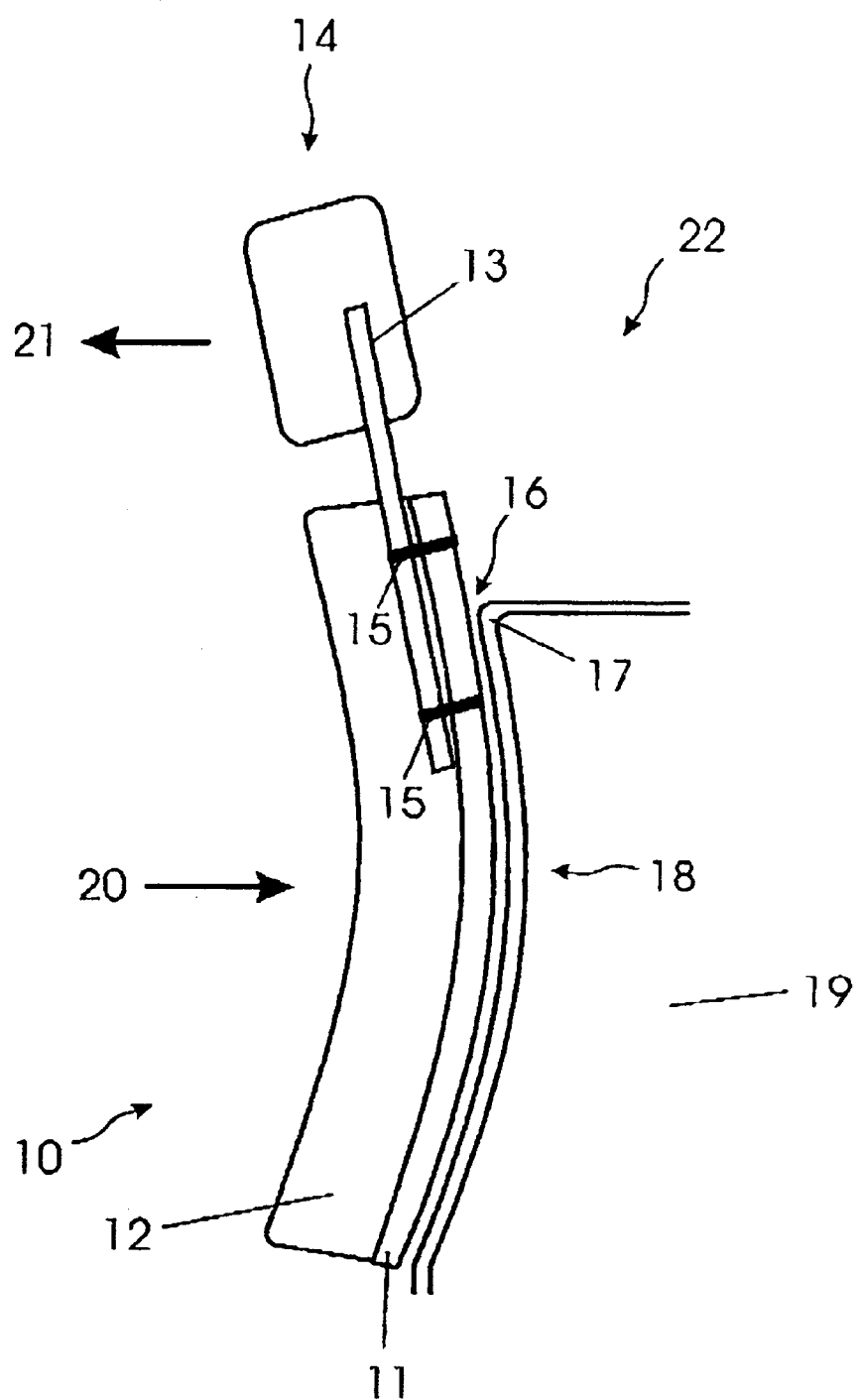
FIG. 2 is a schematic cross-sectional side view of the headrest arrangement illustrated in FIG. 1 in the deformed state.

As can be seen especially in FIG. 2, the contact stay 17 serves to transform the deformation of the backrest 10, which occurs in the case of an acceleration by the inertia force caused by the upper body of a to passenger, into a forward movement 21 of the headrest 14. The inertia force 20 is exerted by the vehicle passenger onto the backrest 10 especially when a rear impact occurs.

This deflecting effect cannot only be achieved with a contact stay 17 but also with other suitable stop devices. Moreover, the stop device 18 can not only be embodied as a sheet member but also as a grate member, a net structure or a frame structure.

In FIG. 2, an additional function of the stop device 18 can be seen which defines a maximum deformation of the backrest 10. Accordingly, especially back injuries of the vehicle passengers cannot occur which could result from an excessive but also anatomically unfavorable and irregular deformation of the backrest 10. Moreover, from the defined maximum deformation a limitation of the forward movement 21 of the headrest 14 results so that an excessively hard impact of the headrest 14 on the back of the head of the vehicle passenger can be prevented.

The backrest 10 or the support shell 11 can be comprised of any suitable materials and can be shaped as a sheet member as well as a frame member, grate-like, net-like or provided with a structure but also of a suitable composite material. For a corresponding configuration of the backrest 10 or a corresponding material selection, the backrest 10 acts during its deformation in an energy-dissipating manner. Accordingly, the kinetic energy of the vehicle passenger can be dissipated across a longer travel distance so that the vehicle seat, at least in the case of a back impact, functions as an additional crumple zone.

In the illustrated embodiment of the seat and headrest arrangement 22 as a backseat, the stop device 18 functions at the same time as a partition between the trunk space 19 and the passenger compartment. Since such a partition is to be provided in any case and must have a corresponding stability, for example, so that, when an accident occurs, luggage pieces carried within the trunk space will not become an injury liability, an especially simple configuration of the seat and headrest device according to the invention is promoted. The same holds true for the front seats because here also a protection of the vehicle passengers, for example, with respect to objects positioned on the backseat bench, must be provided.

Figure 3:
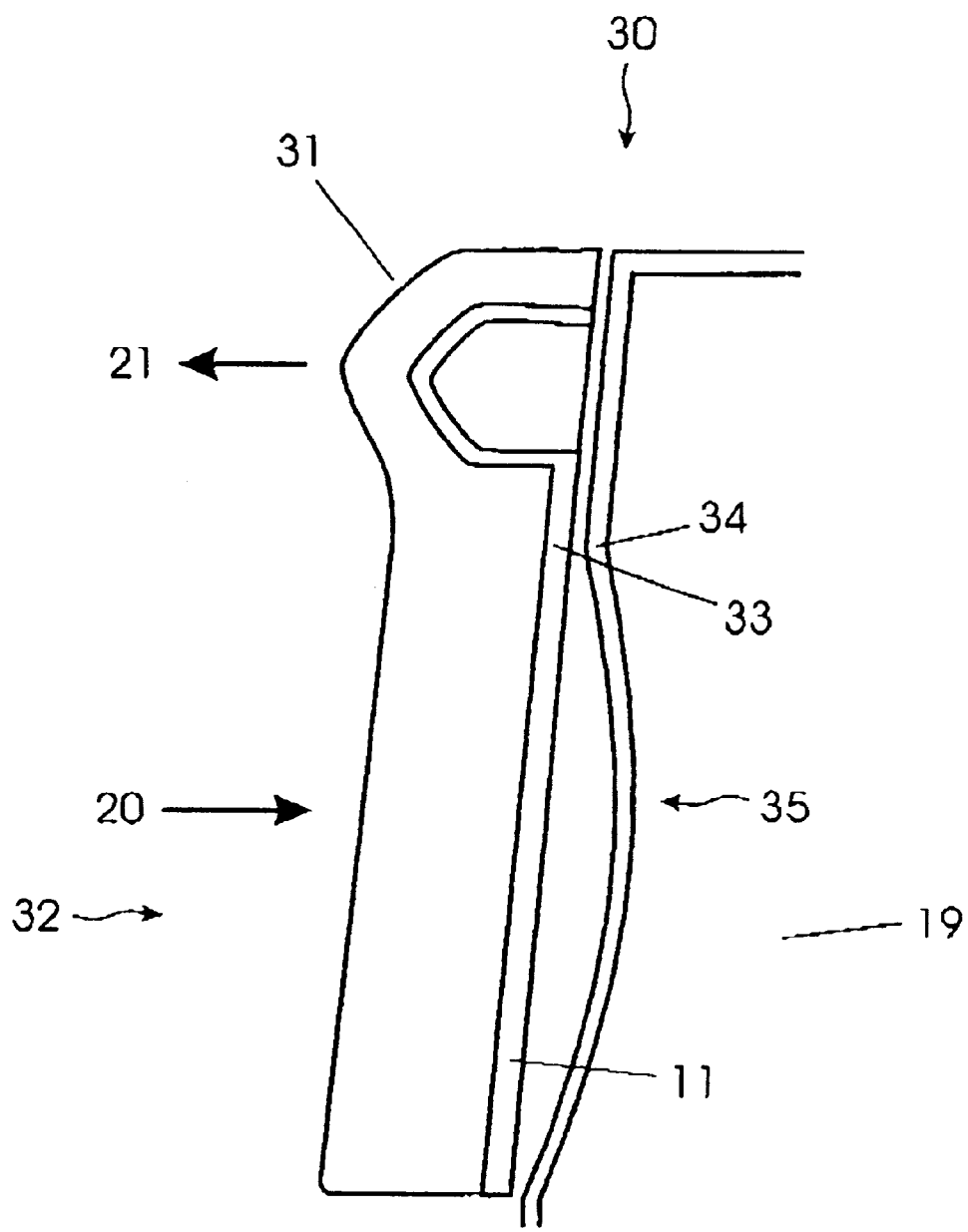
FIG. 3 is a cross-sectional side view of a second embodiment of a headrest arrangement in the undeformed state.

In FIG. 3 a headrest arrangement 30 is illustrated which is also suitable as a backseat. In deviation froze the headrest arrangement 22 described with reference to FIG. 1 and FIG. 2, a headrest 31 is formed as an integral part of the backrest 32 such that the upper part of the support structure forms the headrest 31. In this case, the transition area 33 is also supported on a contact stay 34 which forms the upper edge of a stop device 35 so that in the case of an accident the inertia force 20 exerted onto the backrest 32 is transformed into a forward movement 21 of the headrest 31.

While specific embodiments of the invention have been shown and described in detail to illustrate the application of the principles of the invention, it will be understood that the invention may be embodied otherwise without departing from such principles.

What is claimed is:

1. A headrest arrangement for a vehicle seat, the headrest arrangement comprising:
   at least one backrest;
   a headrest device; and
   a mechanical transmission device for transformation of a deformation of the backrest into a movement of the headrest device, said mechanical transmission device comprising a deformable support structure and a contact stay device, said deformable support structure being supported in a transition area between the backrest and a headrest device on said contact stay device.

2. A headrest arrangement according to claim 1, wherein the support structure is formed as a shell-like support shell.

3. A headrest arrangement according to claim 2, wherein the headrest device is connected by a fastener to the support structure.

4. A headrest arrangement according to claim 2 wherein a part of the support structure forms a part of the headrest device.

5. A headrest arrangement according to claim 2, further comprising:
   a stop device limiting a deformability of the backrest.

6. A headrest arrangement according to claim 1, wherein the headrest device is connected by a fastener to the support structure.

7. A headrest arrangement according to claim 1, wherein a part of the support structure forms a part of the headrest device.

8. A headrest arrangement according to claim 1, further comprising:
   a stop device limiting a deformability of the backrest.

9. A headrest arrangement according to claim 8, wherein the stop device is cavity-shaped.

10. A headrest arrangement according to claim 1, further comprising:
    a stop device limiting a deformation of the backrest, said contact stay being connected to said stop device.

11. A headrest arrangement according to claim 1, wherein the arrangement is provided on a backseat or forms part of a backseat.

12. A headrest arrangement according to claim 1, wherein the arrangement is provided on a backseat or forms part of a backseat.

13. A headrest and vehicle seat arrangement, comprising:
    a backrest with a deformable support structure,;
    a headrest connected to said deformable support structure of said backrest;
    mechanical transmission means for transformation of a deformation of said backrest into a movement of the headrest, said mechanical transmission means comprising said deformable support structure and a contact stay device, said deformable support structure being supported in a transition area between the backrest and said headrest on said contact stay device.

14. A headrest arrangement according to claim 13, wherein the headrest device is connected by a fastener to the support structure.

15. A headrest arrangement according to claim 13, wherein a part of the support structure forms a part of the headrest device.

16. A headrest arrangement according to claim 13, further comprising:
    a stop device limiting a deformation of the backrest, said contact stay being connected to said slop device.

17. A headrest arrangement according to claim 16, wherein the stop device is cavity-shaped.

18. A headrest and vehicle seat arrangement, comprising:
    a backrest with a deformable support structure;
    a headrest with a support part connected to said deformable support structure of said backrest such that a deformation of the backrest moves the headrest;
    a contact stay supporting an upper portion of said deformable support structure in a transition area between said backrest and said headrest device on said contact stay device;
    a stop device for limiting a deformation of said deformable support structure to a predetermined deformation in a region of said backrest below said transition area.

19. A headrest arrangement according to claim 18, wherein the headrest support part is one of a separate part connected by a fastener to the support structure or is integral with said support structure wherein a part of the support structure forms a part of the headrest device.

20. A headrest arrangement according to claim 19, wherein the support structure is formed as a shell-like support shell.

* * * * *